United States Patent Office 3,311,528
Patented Mar. 28, 1967

3,311,528
NEOPRENE-GLASS FIBER STRUCTURES AND METHOD FOR PREPARATION
Alfred Marzocchi, Cumberland, R.I., assignor to Owens-Corning Fiberglas Corporation, a corporation of Delaware
No Drawing. Filed Dec. 5, 1962, Ser. No. 242,349
10 Claims. (Cl. 161—193)

This invention relates to glass fiber-elastomeric systems in the form of glass fiber reinforced elastomeric products, elastomeric coted glass fiber fabrics, laminates and the like, and it relates more particularly to such systems wherein the elastomeric material comprises neoprene, chlorobutyl, or the like elastomeric materials, in whole or in part, or which are capable of being cured with a metal oxide catalyst.

One of the principal reasons for the combination to include glass fibers into the elastomeric products is to incorporate one or more of the desirable characteristics of glass fibers into the formed elastomeric products. The most desirable of these properties comprise the high strength, inertness, and good thermal characteristics of the glass fibers. It has ben found that full utilization cannot be made of the strength properties of the glass fibers when employed in the described combinations with elastomeric materials without the establishment of a strong and permanent bonding relationship between such elastomeric materials and the glass fiber surfaces.

The development of a strong and permanent bonding relationship between the elements described raises a number of problems which are peculiar to glass fibers. Unlike other natural fibers, such as cotton, jute, silk or wool, glass fibers are perfectly smooth, rod-like members onto which it is difficult to achieve physical anchorage of the elastomeric material such that the high strength glass fibers are unable to contribute materially to the strength properties of the elastomeric substance. Unlike the natural fibers, such as cotton, wool, silk and the like, or the synthetic organic fibers, such as the polyesters (Dacron), polyamides (nylon), cellulose esters (rayon), and the like, the glass fibers are not affected by solvents or reasonable temperatures so that it becomes difficult to utilize heat or diluents as means for effecting the bonding relationship between the glass fiber surfaces and the elastomeric materials.

In the light of the inability to make use of such physical forces to achieve a strong and permanent bonding relationship between glass fiber surfaces and elastomeric materials, investigations have been directed to the embodiment of chemical forces. In this area, it has been found that the glass fiber surfaces are dominated by hydrophilic groupings which render the surfaces more receptive to moisture than to organic materials, such as the elastomers. As a result, in the presence of moisture or high humidity, a moisture film forms almost immediately on the glass fiber surfaces to separate the glass fibers from the elastomeric materials whereby any original bonding between the glass fibers and the elastomers is considerably reduced.

This invention is addressed to the development of a glass fiber-elastomeric system wherein fuller utilization can be made of the glass fibers as a reinforcement for the elastomeric materials in the manufacture of molded or laminated elastomeric products, coated fibers and fabrics and the like, and it is an object of this invention to provide a method and means for achieving same.

More specifically, it is an object of this invention to produce and to provide a method for producing glass fiber-elastomeric products of high strength in which a strong and permanent bonding relationship can be developed between the glass fiber surfaces and elastomeric material, which are capable of retention of the desirable properties of strentgh and flexibility of the glass fibers under wet conditions as well as high humidity, which are easy to manufacture and in which the treated glass fibers can be produced as an intermediate article of manufacture for subsequent use in combination with the elastomeric materials in the manufacture of improved glass fiber-elastomeric products, and it is a related object to produce and to provide a method for producing products of glass fibers and neoprene, chlorobutyl, natural rubber compositions containing resinous acids, and the like elastomeric materials which are cured by metal oxides and combinations of such elastomeric materials with other elastomers that are compatible therewith.

As used herein, the term "glass fibers" is intended to include continuous glass fibers which are formed by rapid attenuation of molten streams of glass issuing from a plurality of openings in the underside of a glass melting furnace; staple glass fibers which are formed by rapid attenuation of molten streams of glass issuing from a glass melting furnace by means of blasts of air or steam; strands, yarns and fabrics formed of such continuous or staple glass fibers; and glass flakes in the form of extremely thin and flexible films of glass.

The invention will be described with reference to the combination of such glass fibers and neoprene or chlorobutyl as representative of the elastomeric materials. Characteristic of such elastomeric materials are the presence of methyl chloride groups which enable cure of the elastomeric material in the presence of metal oxides. The invention has application to other elastomers containing such methyl chloride groupings or which are cured by metal oxides and to elastomeric systems wherein the elastomeric component comprises neoprene, chlorobutyl, or other elastomers curable by metal oxides in combination with other elastomeric materials which are compatible therewith, such as natural rubber, especially natural rubber compositions containing resinous acids.

The concepts of this invention reside in the treatment of the glass fibers to provide glass fibers with surfaces containing zinc oxide or magnesium oxide or compounds which are convertible to zinc or magnesium oxide responsive to heat such as the corresponding zinc or magnesium hydroxides.

The metal oxides remain strongly bonded to the glass fiber surfaces to form a part thereof, yet are able, while on the glass fiber surfaces, to enter into the reaction for cure of the neoprene elastomer when cured on the glass fiber surfaces thereby to integrate the cured elastomeric material with the glass fibers. Thus the zinc or magnesium or the mixture of zinc and magnesium oxides on the glass fiber surfaces functions in the dual capacity of an anchoring agent to anchor the elastomeric material to the glass fiber surfaces and as a curing agent to enhance the cure of the elastomeric material.

It is sufficient if the metal oxide is present only as a part of the glass fiber surfaces. When measured in amounts by weight of the glass fibers, it is sufficient if the metal oxide is present on the glass fiber surfaces in an amount within the range of 0.1 to 4 percent by weight and it is preferred to make use of a concentration of about 0.3 to 0.7 percent by weight. This can be achieved by the treatment of the glass fibers with a solution containing from 0.25 to 5.0 percent by weight of the compounds from which the metal oxide is formed. Application can be made from aqueous solutions of magnesium chloride, zinc chloride, or magnesium hydroxide or zinc hydroxide to deposit the metal hydroxide or salt on the glass fiber surfaces. After application is made in the form of magnesium chloride or zinc chloride, the solution in aqueous medium may be adjusted to an alkaline pH for deposition of magnesium or zinc as the hydroxide on the glass fiber surfaces. The hydroxides can be converted to the corresponding oxides by heat treatment. Instead, use can be made of the metal hydroxides in the form of a double salt with ammonia for deposition of the salt on the glass fiber surfaces for subsequent conversion to the metal oxide in response to heating.

The following will illustrate the practice of this invention:

Example 1

Treating composition:

|   | Percent by weight |
|---|---|
| Zinc chloride | 0.5 |
| Water | 99.5 |

The above composition, at a pH of about 3 to 5, is applied onto the individual glass fiber surfaces by means of a wiper pad or the like preferably after the original size applied to the glass fiber surfaces has been removed either by washing or by heat cleaning at a temperature of 950–1100° F. The composition can be applied onto the bare glass fibers in forming or it can be applied onto strands, yarns, or fabrics of glass fibers by running the strand, yarn or fabric through the solution. The pH of the composition is raised to about 7 or above while in contact with the glass fibers to convert the zinc chloride to zinc hydroxide which is deposited on the surfaces of the glass fibers. Thereafter the coated glass fibers are dried and heated to a temperature of about 550–650° F. for conversion of the zinc hydroxide to zinc oxide.

The glass fibers are thereafter combined with neoprene in an uncured state in the ratio of about 1 to 10 percent by weight of glass fibers to 99 to 90 percent by weight of the elastomer. The fibrous component can be admixed with the neoprene or otherwise laid in a predetermined arrangement between layers of uncured neoprene for subsequent cure under heat and pressure to form the molded product. The molding of the neoprene is carried out in accordance with conventional conditions for heat and pressure, such for example as at a temperature of 350–400° F. and at a pressure of between 10 and 100 pounds per square inch.

Example 2

In another example, the glass fibers in the form of strands from which the size applied in forming has been removed, are passed through a bath of magnesium hydroxide in solution in aqueous medium containing magnesium hydroxide in a concentration of about 1 percent by weight. From the bath, the impregnated strands are passed through a drying oven and heated to a temperature of about 500° F. for removing the diluent and for setting the magnesium as the oxide on the glass fiber surfaces.

The treated strands of glass can be used as a reinforcement with uncured neoprene which is then advanced to the cured stage, with or without additional curing or vulcanizing agents. The magnesium oxide serves as a reactant for alkylation of the methyl chloride groups of the neoprene for advancement of the neoprene toward a cured stage. As such, the magnesium oxide, which forms a part of the glass fiber surfaces, is tied into the cured elastomeric material to anchor the elastomer to the surfaces of the glass fibers.

Instead of combining the glass fibers with neoprene, the glass fibers can be employed in a combination of elastomers which makes use of neoprene as one component and another or other elastomers, such as natural rubber, compatible with neoprene as other components. Thus the neoprene is capable of anchorage to the glass fiber surfaces through the magnesium or zinc oxides present on the glass fiber surfaces while the other elastomer is secured by the neoprene to the glass fibers whereby a strongly bonded composite product can be secured.

The magnesium or zinc oxide embodied as a substantially discontinuous component on the glass fiber surfaces, may, instead, be embodied as a component in a size composition applied to the glass fiber surfaces in forming or otherwise. In such event, the treated glass fibers can be processed in the conventional manner to the form desired for use as a reinforcement or other combination with the elastomeric material, such as in the form of strands, yarns, cords, or woven or unwoven fabrics. A suitable forming size embodying the features of this invention may be represented by the following:

Example 3

|   | Percent by weight |
|---|---|
| Partially dextrinized starch | 0.8 |
| Hydrogenated soyabean oil | 2.0 |
| Pelargonate amide solubilized with acetic acid (wetting agent | 0.5 |
| Emulsifying agent | 0.2 |
| Magnesium hydroxide | 0.5 |

The foregoing size composition is applied in a conventional manner to the glass fiber surfaces in forming as by means of a wiper pad which is contacted by the glass fiber filaments prior to their being gathered together to form a strand.

Another concept of this invention, which is not equivalent to the concept previously described, resides in the formulation of the elastomer to contain the zinc or magnesium in the form of the oxide, which, when the elastomer is cured in combination with glass fibers, operates to promote the cure of the neoprene while at the same time providing means for attachment of the neoprene to the glass fiber surfaces whereby the metal oxide functions again in the dual capacity as a curing agent and as an anchoring agent to effect a stronger and more permanently bonded relationship between the glass fiber surfaces and the cured neoprene rubber. The foregoing concept can be practiced with bare glass fibers as a reinforcement or with glass fibers coated with a metal oxide, as previously described.

When the metal oxide, such as zinc or magnesium oxide, is incorporated as a component of the elastomeric material combined with the glass fibers in the manufacture of a glass fiber reinforced elastomeric product, it is desirable to make use of an amount of metal oxide in the ratio of 0.5 to 5.0 percent by weight metal oxide per 100 parts by weight of the uncured neoprene rubber or the combination of the neoprene rubber with other elastomeric materials compatible therewith.

The following is an illustration of the practice of this phase of the invention:

Example 4

Magnesium oxide in an amount corresponding to 3 parts by weight per 100 parts by weight of the neoprene rubber is compounded with the neoprene rubber and other suitable fillers and pigments. The glass fiber components is incorporated in an amount within the range of 1 to 10 percent by weight by mixing the glass fibers with the neoprene or else the glass fiber component can be positioned between layers of the compound and uncured neoprene rubber and the composite molded under heat (350–400° F.) and pressure to advance the neoprene to the cured stage with the glass fibers embedded therein as a discontinuous phase.

Instead of making use of bare glass fibers, use can be made of yarns of glass fibers or fabrics woven thereof and use can be made of such glass fibers in filament, yarn or fabric form with the surfaces of the glass fibers pretreated to provide magnesium or zinc oxide on the surfaces thereof, as previously described. Instead of making use of neoprene as the elastomeric components, use can be made of an elastomeric system formulated of equal parts of neoprene and natural rubber with 3 percent by weight of magnesium or zinc oxide blended therein.

By way of a still further related, though non-equivalent, concept, improved anchorage between the elastic material and glass fiber surfaces can be achieved by the use of a Friedel-Crafts type catalyst as a component on the glass fiber surfaces or in the uncured elastomeric material or both when employed in combination with an anchoring agent on the glass fiber surfaces which is capable of attachment to the glass fibers and which contain a grouping, such as an olefinic group or an aromatic group. Under such circumstances, the catalyst has been found to be effective in creating a cross-tie between the unsaturated group or the methyl chloride group of the elastomer and the unsaturated or aromatic group in the anchoring agent during the cure of the elastomer thereby to tie the elastomeric compound into the anchoring agent which in turn is attached to the glass fiber surfaces.

Such anchoring agent includes the unsaturated silanes or the aromatic silanes such as phenyl silanes containing from 1 to 3 highly hydrolyzable groups and at least one organic group attached to the silicon atom which contains an olefinic or an aromatic group as represented by vinyltrichlorosilane, allyltriethoxysilane, phenyldichlorosilane, and the ilke. It includes also the Werner complex type compounds in which the carboxylato group coordinated with the trivalent nuclear chromium atom contains an olefinic group or an aromatic group as represented by methacrylato chromic chloride and the like.

As the catalyst use can be made of zinc chloride, magnesium chloride, aluminum chloride and the like. The catalyst and the anchoring agent can be applied together to the glass fiber surfaces in an amount to provide about 0.3 to 3.0 percent by weight of catalyst and 0.1 to 3.0 percent by weight of the anchoring agent on the glass fiber surfaces. Instead, the anchoring agent can be applied separately to the glass fibers and the catalyst can be applied either as an overcoat or else incorporated as a component in the elastomeric material. To achieve the desired concentrations of anchoring agent and catalyst on the glass fiber surfaces, the glass fibers can be treated with compositions containing the agents in solution in amounts within the range of 0.5 to 10 percent by weight.

While this concept has application preferably to rubbers characterized by methyl chloride or other halogen groups attached to a carbon atom, such as the methyl chloride groups in neoprene rubber, it finds beneficial use also with other elastomeric materials which cure through contained olefinic groups. The following will illustrate the practice of this phase of the invention:

*Example 5*

An aqueous solution stabilized with ammonium hydroxide and containing 0.5 percent by weight aluminum chloride and 1.0 percent by weight of vinyltrichlorosilane is applied to the glass fiber surfaces and dried to set the organo silane and the aluminum chloride on the glass fiber surfaces.

Glass fibers treated in the manner described are combined with uncured neoprene rubber and fabricated into a product by molding under heat of 350–400° F. and pressure to advance the cure of the elastomeric material.

*Example 6*

In another process, the glass fibers are first coated with methacrylato chromic chloride in aqueous solution in a concentration of about 1 percent by weight. The coated glass fibers are after-coated with a 1 percent solution of magnesium chloride. The treated fibers are then combined in an amount corresponding to 1 to 10 percent by weight with uncured neoprene rubber containing magnesium oxide as a curing agent in an amount of about 2 percent by weight and the composite is molded under heat and pressure.

*Example 7*

In a further modification, the glass fibers in fabric form, and from which all size previously applied has been removed, are treated with an aqueous solution of diphenyl-dihydroxysilane. Neoprene in an uncured state and formulated to contain 2 percent by weight of aluminum chloride along with other fillers and pigments is combined with the glass fibers in multiple layers to provide a laminate which can be molded under heat and pressure to form a composite molded product in which the glass fiber component is strongly anchored to the cured elastomeric material.

It will be understood that changes may be made in the details of construction and formulation without departing from the spirit of the invention, especially as defined in the following claims.

I claim:

1. In a glass fiber-elastomeric system, the improvement wherein the surfaces of the glass fibers, prior to their combination with the elastomeric material, contain an inorganic metal halide in which the metal is selected from the group consisting of aluminum, zinc and magnesium, and an anchoring agent selected from the group consisting of an organo silicon compound having an organic group attached to the silicon atom containing a group selected from the group consisting of an olefinic group and an aromatic group and a Werner complex compound in which the carboxylato group coordinated with the trivalent nuclear chromium atom contains a group selected from the group consisting of an olefinic group and an aromatic group.

2. A glas fiber-elastomeric system as claimed in claim 1 in which the anchoring agent is present in an amount within the range of 0.1 to 3.0 percent by weight and in which the metal halide is present in an amount within the range of 0.3 to 3.0 percent by weight.

3. A glass fiber-elastomeric system as claimed in claim 1 in which the elastomer is a rubber formed with methyl chloride groups.

4. A glass fiber-elastomeric system as claimed in claim 1 in which the elastomer is neoprene.

5. A glass fiber-elastomeric system as claimed in claim 1 in which the anchoring agent and the metal halide are present as separate coatings on the glass fiber surfaces with the anchoring agent innermost.

6. In the method of producing glass fiber-elastomeric products in which a strong and permanent bonding relationship is established between the glass fiber surfaces and the elastomeric material during cure, comprising the steps of coating the glass fibers with a composition containing an inorganic metal halide in which the metal is selected from the group consisting of zinc, magnesium and aluminum and an anchoring agent selected from the group consisting of an organo silicon compound having an organic group attached to the silicon atom containing a group selected from the group consisting of an olefinic group and an aromatic group and a Werner complex compound in which the carboxylato group coordinated with the trivalent nuclear chromium atom contains a group selected from the group consisting of an olefinic group and an aromatic group, combining the glass fibers and the elastomeric material in which the elastomeric material is one that is usable with the metal halide, and then curing the elastomeric material in the combination with the glass fibers.

7. The method as claimed in claim 6 in which the glass fibers are treated with a composition to provide the metal halide on the glass fiber surfaces in an amount within the range of 0.3 to 3.0 percent by weight of the glass fibers and to provide the anchoring agent in an amount within the range of 0.1 to 3.0 percent by weight of the glass fibers.

8. The method as claimed in claim 7 in which the metal halide and the anchoring agent are applied as separate coatings on the glass fiber surfaces with the anchoring agent applied first.

9. The method as claimed in claim 7 in which the metal halide is in the elastomer and the anchoring agent is on the glass fibers.

10. The method as claimed in claim 7 in which the elastomeric material is neoprene.

References Cited by the Examiner

UNITED STATES PATENTS

| | | | |
|---|---|---|---|
| 2,611,718 | 9/1952 | Steinman | 117—72 |
| 2,763,573 | 9/1956 | Biefeld | 117—126 |
| 2,801,189 | 7/1957 | Collier | 117—126 |

ALEXANDER WYMAN, *Primary Examiner.*

JACOB STEINBERG, *Examiner.*

J. W. VAN BALEN, *Assistant Examiner.*